(12) United States Patent
Stavrowsky et al.

(10) Patent No.: US 11,972,449 B2
(45) Date of Patent: *Apr. 30, 2024

(54) VOICE OPERATED ELECTRONIC DEVICE THAT BLOCKS RADIO COMMERCIALS, SUBSTITUTES ALTERNATE AUDIO CONTENT, AND COLLECTS REAL-TIME SURVEY DATA

(71) Applicants: Luke Gregory Stavrowsky, Cerrillos, NM (US); Devon Stavrowsky, Ignacio, CO (US)

(72) Inventors: Luke Gregory Stavrowsky, Cerrillos, NM (US); Devon Stavrowsky, Ignacio, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,418

(22) Filed: Jun. 8, 2023

(65) Prior Publication Data
US 2023/0410132 A1    Dec. 21, 2023

Related U.S. Application Data

(60) Provisional application No. 63/352,463, filed on Jun. 15, 2022.

(51) Int. Cl.
*G06Q 30/0203*   (2023.01)
*G10L 15/22*   (2006.01)

(52) U.S. Cl.
CPC ......... *G06Q 30/0203* (2013.01); *G10L 15/22* (2013.01); *G10L 2015/223* (2013.01)

(58) Field of Classification Search
CPC ............... G06Q 30/0203; G10L 15/22; G10L 2015/223
See application file for complete search history.

(56) References Cited

U.S. PATENT DOCUMENTS

| | | | | |
|---|---|---|---|---|
| 8,599,836 | B2* | 12/2013 | Van Buren | H04M 3/4936 704/270.1 |
| 2002/0083043 | A1* | 6/2002 | Hoshi | G06F 16/9535 |
| 2015/0341410 | A1* | 11/2015 | Schrempp | H04L 65/612 709/231 |
| 2019/0121610 | A1* | 4/2019 | Olsovsky | G06F 3/167 |

* cited by examiner

*Primary Examiner* — Nadja N Chong Cruz
(74) *Attorney, Agent, or Firm* — Dale J. Ream

(57) ABSTRACT

A system and method for blocking normal media content signals, such as radio program signals emitted on a speaker and substituting alternative content for blocked signals includes a voice control module operable to receive a blocking command via a microphone. Receiving a blocking command results in the normal content being blocked and predetermined alternative content is played for either a user specified time or a predetermined time. Control over the radio or other media device is completely oral via speech recognition technology. The system may include a predetermined time delay before alternative content is played. The system may include a voice activated survey module ("VAS") enabling a user to leave comments regarding radio commercial content. Comments are tracked in real time and at finite locations within the content.

15 Claims, 5 Drawing Sheets

VOICE OPERATED ELECTRONIC DEVICE THAT BLOCKS RADIO COMMERCIALS, SUBSTITUTES ALTERNATE AUDIO CONTENT, AND COLLECTS REAL-TIME SURVEY DATA

REFERENCE TO RELATED APPLICATIONS

This application claims the priority of provisional patent application U.S. Ser. No. 63/352,463 filed Jun. 15, 2022 titled Voice Operated Electronic Device that Blocks Radio Commercials and Substitutes Alternate Audio Content, which is related to U.S. patent application Ser. No. 16/512,678 filed Jul. 16, 2019, titled Voice Operated Electronic Device that Blocks Radio Commercials and Substitutes Alternative Audio Content, now U.S. Pat. No. 10,594,418, which claims the benefit of provisional patent application U.S. Ser. No. 62/698,755 filed Jul. 16, 2018 titled Voice Operated Electronic Device That Blocks Radio Commercials and Substitutes Alternate Audio Content In Place Of the Blocked Commercials, all of which are incorporated in their entirety herein by reference.

BACKGROUND OF THE INVENTION

This invention relates generally to voice operated electronic devices configured to block radio commercials and, more particularly, to a system and method for people listening to an electronic media device, such as AM/FM radio to allow them to block commercials and substitute alternate audio content (music, voice, or sounds of any kind) during this blocked period. This invention includes a voice-activated survey module ("VAS") operable to collect user-supplied survey data in real-time concerning commercials played on the electronic media device.

A frequent complaint by listeners of radio programs, whether talk radio or music radio or television, is that they become mildly or even severely annoyed by what is seen as wasted time on commercials. Many listeners are even so bothered by the content or amount of time spent on commercials that they are willing to pay extra money to eliminate advertisements altogether. This has become common with online streaming audio services. However, listeners of traditional radio and television programs have so far not been presented with a viable solution to stop commercials or to do so entirely by hands-free voice commands.

Various patent proposals have been made for stopping or blocking commercials. Although presumably effective for their intended purposes, the existing proposals require complex and expensive circuitry that tries to detect when a commercial comes on the airwaves and then block it until the actual program returns. In other words, existing devices or systems that try to block commercials are far more complicated in that they attempt to fully automate the commercial blocking process. This results in expensive and impractical (not cost effective) designs. In addition, existing proposals do not offer a user an indicator, whether visually or audibly, that a commercial has been blocked and that alternative content will start within a period of seconds.

In another aspect, it has become common for purveyors of media commercials and advertisements to conduct surveys, questionnaires, and analytics to determine customer behavior. However, the existing systems do not provide a voice activated survey system immediately available to customers to whom an advertisement has just been exposed. In other words, there are no "real time" voice activated survey tools in use today.

Therefore, it would be desirable to have a system and method for blocking radio commercials and for replacing blocked content with other media content for a quantity of time specified by the listener or, if not indicated, for a predetermined amount of time. Further, it would be desirable to have a system and method for blocking and substituting that works entirely by detecting predetermined voice commands of a user and actuating the blocking and substituting accordingly. In addition, it would be desirable to have a system and method for blocking and substituting that provides a user a 1 to 5 second time delay before alternative content following a "block" command has been received. Still further, it would be desirable to have a system and method for blocking and substituting that enables a user to leave a voice activated survey or critique of media commercials/advertisements.

SUMMARY OF THE INVENTION

A system and method for blocking radio commercials and for replacing blocked content with other media content according to the present invention includes a system having a voice operated electronic device that blocks radio commercials upon detecting a predetermined voice command and a spoken or predetermined quantity of time and substitutes alternate content in place of the blocked commercials. In some embodiments, the present system eliminates the need for radio listeners to have to listen to commercials during live broadcasts of programming. In another embodiment, a user is notified either visually or audibly that alternative content will be presented within a predetermined number of seconds following a "block" audible command being received.

In another aspect, the system for blocking and replacing, the system may include a voice activated surveying element (a.k.a. the VAS system) that allows immediate feedback regarding advertising content using only voice commands. The VAS system has the following functional advantages:

- VAS enables users to comment regarding content in real time using only their voice without questionnaires or even a remote control.
- VAS allows ad preference tracking on legacy programming (radio and TV) which is traditionally non-interactive.
- VAS allows for ad preferences tracking feedback which can be used for multiple purposes including improving ads, preference tracking related specifically to individual homes or cars (the set-top box for stand-alone device or infotainment system in cars containing ADX will also have an IP address associated with it) and specifically to make the end user or subscriber feel that their opinions are wanted and appreciated.
- VAS algorithms accept all comments and pick keywords out for better ad preference tracking.
- VAS creates "potential for engagement" and otherwise ignored ad streams when combined with ADX ad blocking (block some ads, comment on others) or even if used by itself.
- VAS creates "incentives for people to interact" that can result in "rewards" of different types by the company tracking commenting activities.
- VAS provides more detailed ad preference tracking information than a selection to "skip add" or "block this ad" or specific survey questions would allow for. VAS can allow for people to comment on a variety of generic or non-generic products or services; for example, "I love hamburgers" versus "I love McDonald's hamburgers").

VAS can relate commenting to the product or service by examining the time in the ads stream the comment was made, e.g., 1 minute, 15 seconds since a comment was made).

VAS system can work on any kind of signal or device currently not collecting "freely offered voice activated survey commenting" (streaming/cable/satellite/OTA, etc.) for all reasons mentioned above.

VAS can track ad preferences down to the specific user or home address due to the fact that any given device contains a known IP address. In other words, future advertisements can be tailored according to the specific IP address associated with the VAS or specific media device itself.

Therefore, a general object of this invention is to provide a system and method for blocking broadcast media content and substituting alternative content for a user-defined or predetermined amount of time using voice activated commands.

Another object of this invention is to provide a blocking and substituting system, as aforesaid, that provides visual or audible notice that alternative content will be displayed within a predetermined number of seconds following a "block" command.

Still another object of this invention is to provide a blocking and substituting system, as aforesaid, that includes a voice activated surveying system that enables a user to leave a voice recording in real time regarding a media commercial/advertisement.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
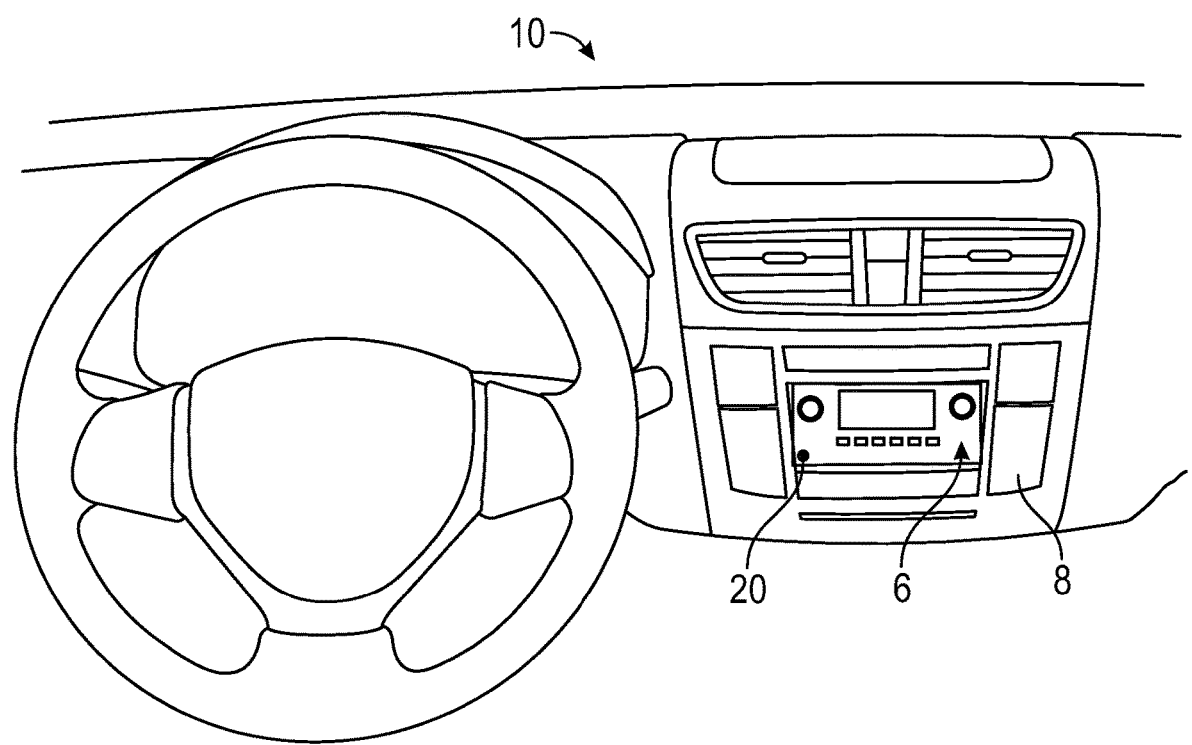
FIG. 1 is a plan view diagram illustrating a system and for blocking content signals installed for use with an automobile radio system according to a preferred embodiment of the present invention.

A system and method for blocking broadcast media content and substituting alternative content for a user-defined or predetermined amount of time using voice activated commands will now be described in detail with reference to FIGS. 1 to 4 of the accompanying drawings. The system 10 and method according to the present invention includes an electronic media device 6 such as a radio or television that receives media signals for direction to a speaker 8, a voice control module 22, a microphone 20, and software that facilitates the invention as will be described in detail below. It will be understood that although an AM/FM radio, such as may be installed in an automobile, is used throughout the present disclosure, radio is merely exemplary and the media device 6 may alternatively be satellite radio, streaming audio or video signals via the internet, cable television, or other sources of audio or video content having signals that may be blocked, replaced, or otherwise affected by the invention described below. It is also understood that one of ordinary skill in the art of radio and television manufacturers will understand the electronic components needed to implement such systems for receiving respective media signals and directing them to speaker systems, storage systems, and the like. The present invention may include electronics situated in an electronics box separate but electrically connected to the radio or media device 6 or may be integrated electronically with the radio or media device itself. In an embodiment, the electronics box may include one or more ports for receiving memory devices, respectively, having alternative content stored therein, as will be described in more detail later and which can be seen in the exemplary circuit of FIG. 4.

With reference to FIG. 1, the present invention will be described using the example of cooperating or integration with an AM/FM radio in the nature of a radio installed on the dashboard or console of an automobile. Preferably, a system 10 according to the present invention includes a microphone 20 installed on the dashboard, on the radio itself, or at a location proximate to the radio or to the user, e.g., the driver of the automobile. In other words, the microphone 20 is positioned where it may receive voice commands from a user. When the system 10 is activated, the microphone 20 continuously "listens" for audible commands from persons speaking proximate to the microphone 20. The microphone 20 is in data communication with a control module, i.e., with electronic elements programmed and capable of receiving and processing human speech. For instance, a voice control module 22 is an assembly of electronics or computer software capable of speech recognition. Speech recognition software is most often recognized in the context of a user speaking into a microphone, such as via a headset, and then having that speech translated into a word processor document. Speech recognition is also used in mobile phones that enables a user to compose an email or text message without having to type or press buttons. However, speech recognition is not usually associated with controlling a media device such as an automobile radio and especially not associated with blocking a radio commercial and substituting alternative content for the blocked content.

The microphone 20 may be in data communication with the voice control module 22 so as to transmit a voice command to the voice control module 22 for interpretation and, if appropriate, to take action. More particularly, the voice control module 22 may itself be a microprocessor having electronics sufficient to evaluate incoming sounds and looking for a predetermined command or may simply be electrically connected to a microprocessor (referred to simply as a processor 24), and may include a combination or assembly of electronic components. Even more particularly, the processor 24 may be in data communication with a non-volatile memory 26 having a plurality of storage location operable to store data and programming instruction, the processor 24 being capable of actuating other components according to the programming instruction (i.e., software). A power source 28, such as a battery, may be electrically connected to the processor 24 and, therefore, indirectly electrically connected to other electric and electronic components.

Predetermined words to be recognized and which are associated with certain actions may be programmed into memory 26 at the point of manufacture or by the user during a setup routine before use. For example, a user may assign a unique name to the radio, television, or other device to be controlled. The software would then be initiated when it detects and understands the predetermine naming word. For instance, the user may something like "hijacker block 4" and the voice control module 22 would recognize this code word as a blocking command to then be acted on as described below.

Figure 4:
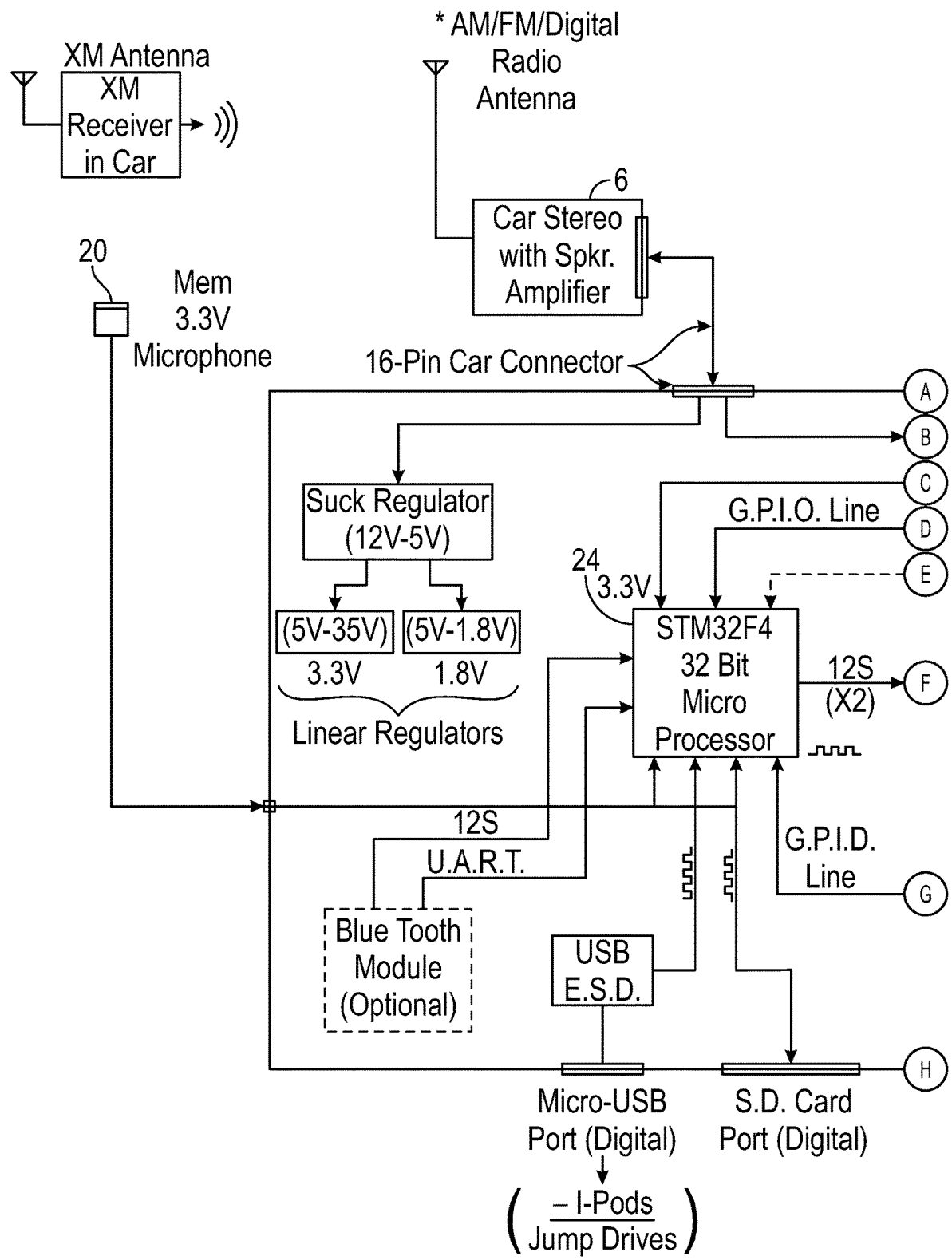
FIG. 4 is a schematic of an exemplary circuit configured to perform the present invention.
Figure 4:
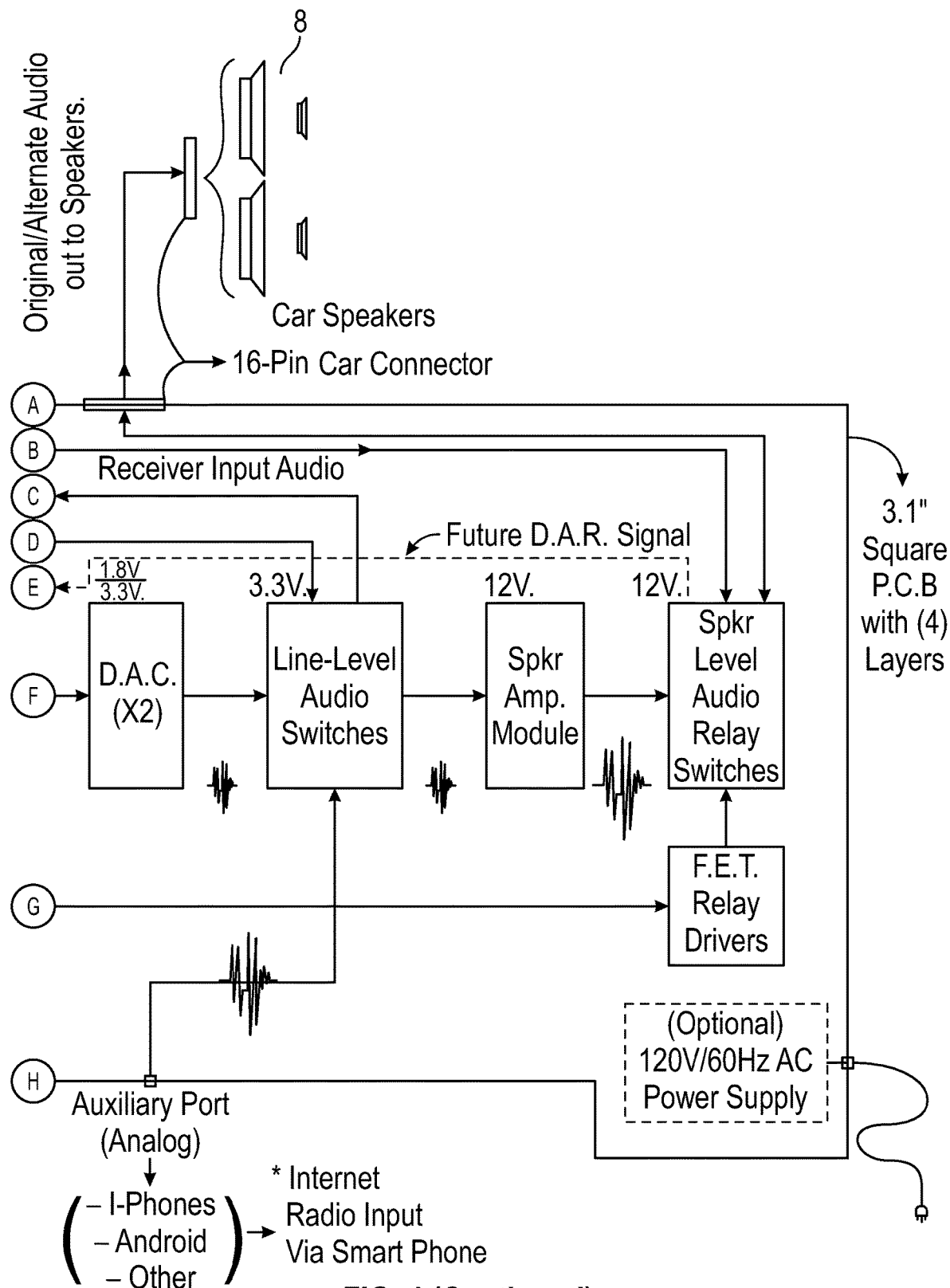

The voice control module 22 or processor 24, in general, is intended to be installed, at the factory or by a third-party technician. The radio, or other media device, may include a controller or similar electronic device for receiving media contact signals and directing received content signals to a speaker 8 for publication, e.g., a car speaker playing a radio program. More particularly, the radio or media device may include an antenna (not shown) for receiving content signals according to a frequency or channel to which the radio is tuned, e.g., music on 98.1 FM or the Rush Limbaugh Show on 980 AM. Similarly, television stations may be selected by channels associated with respective frequencies, with incoming signals arriving by cable, internet, or satellite platforms. In any case, the present system 10 is electrically connected—by wire or by integration—to the media device 6 and, under software control, is capable of stopping incoming or received content signals from being delivered to the speaker 8 and, as will be described later, being replaced with alternative content stored in memory 26. It is understood that the process, method, and software that the implements the present invention may include a combination of hardware and software as shown in the exemplary circuit of FIG. 4. For instance, the microprocessor shown in FIG. 4 may be the processor 24 that implements process 100 described later. FIG. 4 also shows a car radio as the media device 6 and the speakers 8 in data communication with the processor 24.

In another aspect, alternative or replacement content may be stored in memory 26, such as at the point of manufacturing or, in some embodiments, uploaded by a user from a mobile device, phone, iPod, computer, USB port, or the like. The invention may include a physical electronics housing having one or more ports for connection to the peripheral devices listed above, the ports being in communication with the processor 24 and in data communication with the controller of the media device 6 or directly with the speakers 8. For instance, the replacement data may include a self-help message, a spiritual message, a podcast, an educational program, a foreign language tutorial, music, or just silence. Preferably, the alternative content is the same length and duration of a 60-second or two-minute block typical of a commercial break. In other words, the alternative or replacement content is intended to last the precise length of a commercial break so that the user does not miss out on any of the radio programming for which he has tuned in.

In a critical aspect, a user is able to block commercials, or any segment of a media program for that matter, for a user-determined or a predetermined amount of time. Preferably, a user is able to speak a period of time immediately following speaking the predetermined code word indicating a desire to block received media signals. For example, speaking "Hijacker Block 4" could be interpreted as initiating the blocking of received content signals 27 for the next 4 minutes on the media device associated with the name "hijacker" and then unblocking the received content signals to the speaker 8. According to programming, if no time parameter for blocking received signals is given, the system 10 may be programmed to supply a predetermined amount of time, say 30 seconds, 60 seconds, 120 seconds, or the like. Simultaneously with recognizing the spoken word associated with blocking, the processor 24 may actuate the memory 26 and controller associated with the electronic media device 6 to send and receive the alternative or replacement content data, respectively. In an embodiment, the substitute content may be directed directly from a USB port (i.e. to which a thumb drive is inserted) to the electronic media device. This may be accomplished through channel switching, i.e., changing the address of an input device via software pointers, and the like. The received signals are blocked and the replacement content is substituted so long as the blocking timer has not expired.

In a related aspect, the system for blocking and substituting 10 includes a timed delay feature occurring after the code word indicating a user's desire to block an upcoming commercial is received. In other words, the system 10 may include a visual or audible countdown from 1 to 5 seconds before the alternative content is played or, alternatively, by displaying a timer icon or audibly announcing "alternative content in 5 seconds" or the like.

Returning to the description of playing alternative content, when a timer expires indicating the user determined time or the predetermined time as expired, the alternative content signals may be ended and the regular received content signals 27 may be restored and allowed to go to the speaker 8. Further, when no specific blocking time is spoken by the user, the predetermined time assigned automatically may be referred to as "sampling" or a "sampling mode." In this instance, when the assigned time expires, control is shifted back to the regular content signals, i.e., goes back to the station, at least for a predetermined amount of time such as 10 seconds, 30 seconds, or the like. If the commercials are, in fact, finished, the user may speak the command "RETURN" and control is shifted back to regular program content; otherwise, alternative content is directed to the speaker 8 for another 30 seconds or more and the program may again be sampled, and so on until the user commands the system to "return" to regular programming. This mode is termed "sampling" as it corresponds to the traditional circumstance where a user samples other stations while his preferred station airs a block of commercials.

In another aspect, the user is enabled to select and audibly record a critique of a commercial/advertisement currently playing or as selected. In an embodiment, a user may speak an audible command into the microphone 20 such as "survey" which will be interpreted by the voice recognition module 22 as being indicative of the user's desire to leave an audible and recorded message concerning the perceived effectiveness, usefulness, appropriateness, or persuasiveness of the selected advertisement. Accordingly, the microphone 20 is configured to listen for and record subsequent words that may be recognized by the voice recognition module 22. In an embodiment, the recorded survey may pertain to a currently playing commercial or on a user selected commercial. In an embodiment, a user comments, also referred to as "survey data" or quote recorded survey data" may be transmitted in a manner consistent with how the content data signal is being transmitted, such as via a radio signal transmitter, cell phone communication signal, satellite phone signal, or the like. In another embodiment, of course, the same technician who may have installed the media device may collect the survey data at routine intervals of time.

A process 100 (FIG. 2) illustrates the method for blocking, substituting, and critiquing media content signals according to the present invention and will now be described. The block 102 represents the media device 6 (e.g., a radio) receiving media content signals 7 and playing them via a speaker 8. This is the normal state of the invention when the system 10 is powered on. As described above, this could represent radio, television, internet streaming, or other media delivery platforms). The process 100 then proceeds to block 104 which represents that the microphone 20 is activated and is "listening" for a voice command. The process 100 proceeds to step 106, at which the processor 24 (or, the voice control module 22 in data communication with the processor 24) determines if a "block" command has been received by the microphone 20 and, if so, the process 100 proceeds to step 107. Otherwise, the process 100 continues to step 130 which is described later. At step 107, an icon indicative of the upcoming replacement content is displayed or an audible announcement such as "Alternative content coming in 5, 4, 3, 2, 1", or the like. Preferably, the automatic delay feature before alternative content is played is about five seconds. The process then proceeds to step 108.

Then, at step 108, the processor 24 determines if the user has also spoken a quantity of time (called a user timer command) over which the radio signals are to be blocked and, if so, proceeds to step 116; otherwise, thereby the process 100 proceeds to step 110. At step 110, the processor 24 determines if a time has expired for the user to say the user timer command and, if that timer has expired, then the process 100 proceeds to step 114; otherwise, the process 100 proceeds to step 112. At step 112, the timer 29 is either actuated or continues to run and the process 100 loops back to step 108 at which a user still has opportunity to speak the user timer command.

At step 114 (when no user timer command was given before the input timer expired), the blocking timer is set to a predetermined amount of time (i.e., the "sampling" condition described above, such as two minutes or the like). By contrast, at step 116, the blocking timer is set to a time equivalent to the user's voice command regarding time. For instance, if the user's command is "hijacker block 4, the blocking timer is set to 4 minutes and actuated to count down. After either step 114 or 116, the content signal is switched to direct the substitute content to the speaker 8 as described above. The alternative content signals are referred to with reference numeral 25. The process 100 proceeds to step 120 at which the processor 24 determines if the blocking timer has expired and, if so, the process 100 proceeds to step 102 and, essentially, starts over, i.e., the received content signals 7 are unblocked and allowed to be directed to the speaker 8. It is understood, however, that returning to regular received content signals 7 may be modified, in an embodiment, according to the "sampling" mode described above, e.g. where regular program signals are sampled for a predetermined number of seconds until a user speaks a return command. In other words, the substitute content was played so long as the received content signals were played and the blocking timer was unexpired after which time the received content signals, e.g., radio program, began playing again.

Figure 2:
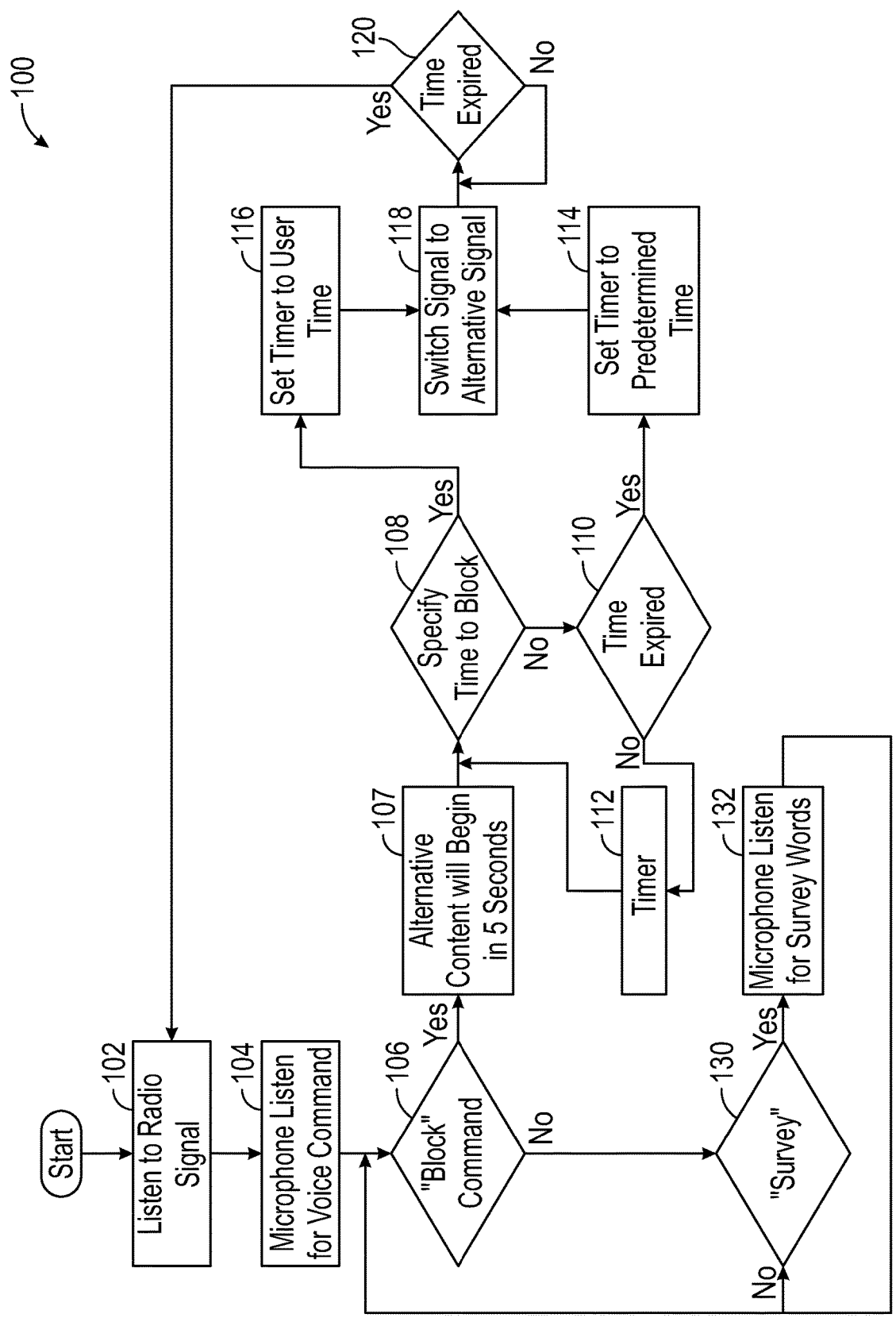
FIG. 2 is a flowchart illustrating the method for blocking media content and substituting alternative media content to replace the blocked content signals.
Figure 3:
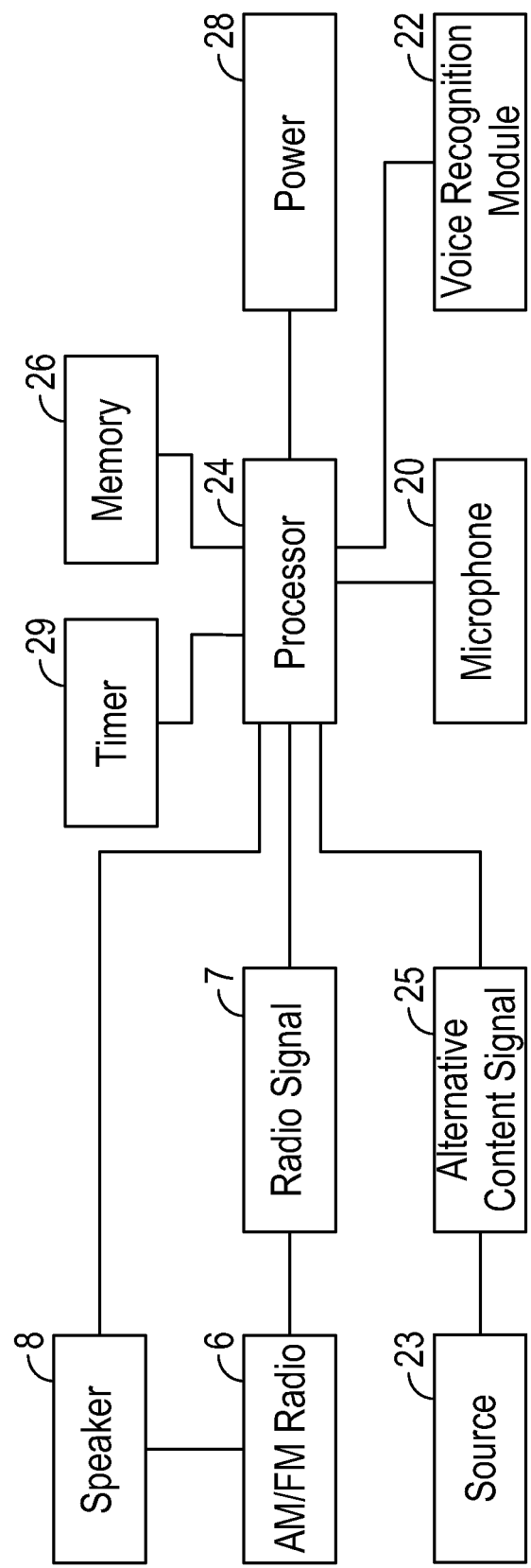
FIG. 3 is a block diagram illustrating the electrical and electronic components of the system according to the present invention.

With further reference to the flowchart of FIG. 2, in the case that the "Block" command is not recognized in step 106, the process 100 proceeds to step 130 at which the processor 24 (or, the voice control module 22 in data communication with the processor 24) determines if a "survey" command has been received by the microphone 20 and, if so, the process 100 proceeds step 132. Otherwise, the process 100 may cycle back to step 106. A preferred embodiment the present invention includes a voice-activated survey module ("VAS") that may be programmed with a plurality of questions that are pertinent and contextual to the commercial being reviewed. These questions may be published to the media device, such as to the speakers or even to a touchscreen display.

At step 130, the microphone 20 listens for words recognizable as survey or critique words. It is understood that after a certain amount of time or a maximum word count, the survey may be ended in the process may return to step 106. It is important to note that the comments or critiques being received and recorded are being done in real time, meaning the VAS module is configured to record or timestamp the precise moment in time in which a user begins leaving a survey and may also record a precise location along a current content signal so that a marketer or advertiser can accurately track what content is being reviewed.

Without referring to the flowchart, the method of use can be explained as follows. When using the present system that blocks radio commercials and substitutes alternate audio content in place of the blocked commercials of the present disclosure, a person may use simple voice commands to operate the system, whereby the end user identifies the commercial stream, gets the voice operated electronic device's attention (by calling its name), gives a command (out of pre-programmed command set) to block, gives a time period to block, and the system then carries out commands, performing all steps automatically from there on out. In this way, the end user can choose to listen to the commercials he/she prefers to hear, block all of them, or simply block a portion of the commercials. The user remains in control over commercials. No physical motions (turning dials, pushing buttons, etc.) would be required to perform the tasks the system and method. The end result is that people listening to radio programming can end the irritating problem of listening to commercials over and over again during the live broadcasting of AM/FM radio programming.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. It is understood that while certain forms of this invention have been illustrated and described, it is not limited thereto except insofar as such limitations are included in the following claims and allowable functional equivalents thereof.

We claim:

1. A system for blocking, substituting, and critiquing content on an electronic media device that receives content signals and that has a controller for delivering the received content signals to a speaker, said content blocking, substituting, and critiquing system comprising:
   a microphone mounted proximate the electronic media device and operable to receive voice commands;
   a voice control module in data communication with said microphone and with the electronic media device, said voice control module being configured to determine if a human voice command received via said microphone is a predetermined survey command indicative of a user's intention to submit a survey or critique associated with said current content signal and, if so, allow a current content signal being received by the electronic media device and initiate a voice-activated survey program ("VAS") that is operable to record survey data via said microphone in real time;
   wherein said voice control module is configured to determine if a human voice command received via said microphone is a predetermined blocking command indicative of a user's intention to block the current content signal and, if so, block a current content signal being received by the electronic media device if said received human voice command is said blocking command;

a processor;

a nonvolatile memory in data communication with said processor and having storage locations for storing replacement content data and programming instructions;

wherein said processor is in data communication with said voice control module, said input device, and with the electronic media device;

wherein said voice control module is configured to:
determine if said predetermined blocking command includes a user timer command and, if so, to actuate a blocking timer for a time equivalent to said user timer command;
determine if said predetermined blocking command does not include a user timer command and, if not, actuate said blocking timer for a time equivalent to a predetermined time; and
unblock said current content signal when said blocking timer expires.

2. The system as in claim 1, wherein said VAS is programmable to include a plurality of questions each being pertinent to said current content signal and is operable to publish sequentially said plurality of questions via the electronic media device.

3. The system as in claim 2, wherein said microphone is operable to receive said survey data and is in data communication with said VAS and the VAS is configured to record said received survey data in real time.

4. The system as in claim 1, wherein said VAS is operable to generate a keyword index from said recorded survey data.

5. The system as in claim 1, wherein said VAS is configured to timestamp a time or location within said current content signal at which said current content signal was interrupted by said determination that said human voice command was indicative of a predetermined survey command.

6. The system as in claim 1, wherein said voice control module is configured to:
determine if said predetermined blocking command includes a user timer command and, if not, to actuate an input timer for a predetermined time, whereby giving opportunity for a user to actuate said user timer command; and
determine if said input timer has expired and, if not, repeat the step of determining if said predetermined blocking command does not include a user timer command.

7. The system as in claim 6, wherein said voice control module is configured to continue actuating the controller of the electronic media device to continue blocking the received media content signals to the visual display until said blocking timer has expired.

8. A system for blocking, substituting content and surveying content on an electronic media device that receives content signals and that has a controller for delivering the received content signals to a speaker, said system comprising:
a microphone mounted proximate the electronic media device and operable to receive voice commands;
a voice control module in data communication with said microphone and with the electronic media device, said voice control module being configured to:
determine if a human voice command received via said microphone is a predetermined blocking command indicative of a user's intention to block the current content signal and, if so, block a current content signal being received by the electronic media device if said received human voice command is said blocking command;
determine if a human voice command received via said microphone is a predetermined survey command indicative of a user's intention to submit a survey or critique associated with said current content signal and, if so, allow a current content signal being received by the electronic media device and initiate a voice-activated survey program ("VAS") that is operable to record survey data via said microphone in real time;

a processor;

and a nonvolatile memory in data communication with said processor and having storage locations for storing replacement content data and programming instructions;

wherein said processor is in data communication with said voice control module, said input device, and with the electronic media device;

wherein said voice control module is configured to:
determine if said predetermined blocking command includes a user timer command and, if so, to actuate a blocking timer for a time equivalent to said user timer command;
determine if said predetermined blocking command does not include a user timer command and, if not, actuate said blocking timer for a time equivalent to a predetermined time; and
unblock said current content signal when said blocking timer expires.

9. The system as in claim 8, wherein said VAS is configured to include a plurality of questions each being pertinent to said current content signal and is operable to publish sequentially said plurality of questions to the electronic media device.

10. The system as in claim 9, wherein said microphone is operable to receive said survey data and is in data communication with said VAS and the VAS is configured to record said received survey data.

11. The system as in claim 8, wherein said VAS is operable to generate a keyword index from said recorded survey data.

12. The system as in claim 8, wherein said VAS is configured to timestamp a time or location within said current content signal at which said current content signal was interrupted by said determination that said human voice command was indicative of a predetermined survey command.

13. The system as in claim 8, wherein said control module is configured to:
determine if said predetermined blocking command includes a user timer command and, if not, to actuate an input timer for a predetermined time, whereby giving opportunity for a user to actuate said user timer command; and
determine if said input timer has expired and, if not, repeat the step of determining if said predetermined blocking command does not include a user timer command.

14. The system as in claim 8, wherein said voice control module is configured to continue actuating the controller of the electronic media device to continue blocking the received media content signals to the visual display until said blocking timer has expired.

15. The system as in claim 8, wherein said VAS is assigned a unique IP address and is configured such that future advertising data is adjusted according to said recorded survey data.

* * * * *